(12) United States Patent
Yamakawa

(10) Patent No.: US 10,896,359 B2
(45) Date of Patent: Jan. 19, 2021

(54) SHIFTING A POWER STATE OF AN IMAGE PROCESSING APPARATUS BASED ON A COMMAND FROM AN INFORMATION PROCESSING APPARATUS

(71) Applicant: CANON KABUSHIKI KAISHA, Tokyo (JP)

(72) Inventor: Junichi Yamakawa, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/880,708

(22) Filed: May 21, 2020

(65) Prior Publication Data

US 2020/0285920 A1    Sep. 10, 2020

Related U.S. Application Data

(63) Continuation of application No. 14/658,028, filed on Mar. 13, 2015, now abandoned, which is a continuation of application No. 14/013,309, filed on Aug. 29, 2013, now Pat. No. 9,007,638.

(30) Foreign Application Priority Data

Aug. 31, 2012  (JP) ................................. 2012-191433

(51) Int. Cl.
*G06F 3/12* (2006.01)
*G06K 15/00* (2006.01)
*G06F 1/3206* (2019.01)
*G06F 1/3234* (2019.01)

(52) U.S. Cl.
CPC ....... *G06K 15/4055* (2013.01); *G06F 1/3206* (2013.01); *G06F 1/3284* (2013.01); *G06F 3/1221* (2013.01); *G06F 3/1229* (2013.01); *G06F 3/1285* (2013.01); *Y02D 10/00* (2018.01)

(58) Field of Classification Search
CPC . G06K 15/4055; G06F 3/1229; G06F 3/1221; G06F 3/1285; G06F 1/32; G06F 1/3203; G06F 1/3206; G06F 1/3284; G06F 1/3287; G06F 1/3293; H04N 1/00885; H04N 1/00891; H04N 1/00896; H04N 1/00904
See application file for complete search history.

(56) References Cited

U.S. PATENT DOCUMENTS

2012/0216061 A1    8/2012   Shouno

FOREIGN PATENT DOCUMENTS

| CN | 101100141 A | 1/2008 |
|----|-------------|--------|
| CN | 102215220 A | 10/2011 |
| JP | 2010-2500 A | 1/2010 |

*Primary Examiner* — Eric A. Rust
(74) *Attorney, Agent, or Firm* — Canon U.S.A., Inc. IP Division

(57) ABSTRACT

An information processing system includes a first information processing apparatus, and a second information processing apparatus. The second information processing apparatus periodically acquires information from the first information processing apparatus, and stops periodically acquiring information if there is a factor for shifting a power state of the first information processing apparatus into a power saving state. The second information processing apparatus transmits information to the first information processing apparatus in a case where periodically acquiring information from the first information processing apparatus is stopped. The first information processing apparatus shifts into the second power state if the information is received.

17 Claims, 11 Drawing Sheets

SHIFTING A POWER STATE OF AN IMAGE PROCESSING APPARATUS BASED ON A COMMAND FROM AN INFORMATION PROCESSING APPARATUS

CROSS REFERENCE TO RELATED APPLICATIONS

The present application is a continuation of U.S. patent application Ser. No. 14/658,028, filed Mar. 13, 2015; which is a continuation of U.S. patent application Ser. No. 14/013,309, filed on Aug. 29, 2013, now U.S. Pat. No. 9,007,638, issued Apr. 14, 2015, the content of which is expressly incorporated by reference herein in its entirety. This application also claims the benefit of Japanese Patent Application No. 2012-191433 filed Aug. 31, 2012, which is hereby incorporated by reference herein in its entirety.

BACKGROUND OF THE INVENTION

Field of the Invention

The present disclosure relates to an information processing system that includes an image processing apparatus and an image processing controller which are cooperatively operable to perform image processing.

Description of the Related Art

As discussed in Japanese Patent Application Laid-Open No. 2010-2500, to meet requirements of power saving for electric devices, such as an image forming apparatuses and the like, it is conventionally known to bring an image forming apparatus into a power saving state when the image forming apparatus has not performed any operation during a predetermined period of time or if a predetermined condition is satisfied. For example, the image forming apparatus shifts into the power saving state if a predetermined time has elapsed since completion of print processing performed by a printer unit and scanner processing performed by a scanner unit or if a predetermined time has elapsed since disconnection in the communication with an external device.

The above-described image forming apparatus may be connected to an image processing controller that performs image processing in cooperation with the image forming apparatus. The image processing controller connected to the image forming apparatus periodically acquires information (sheet feed stage information, sheet information, toner information, and the like) about the image forming apparatus and displays the acquired image forming apparatus information pieces on a computer of a user who uses the image forming apparatus. As described above, the image forming apparatus and the image processing controller periodically communicate with each other. Therefore, the image forming apparatus may fail in shifting into the power saving state due to periodical communications. Even when the image forming apparatus has successfully shifted into the power saving state, the image forming apparatus may soon return from the power saving state due to periodical communications.

SUMMARY OF THE INVENTION

According to an aspect of the present disclosure, an information processing system includes a first information processing apparatus configured to take a first power state and a second power state that is lower in power consumption than the first power state, and a second information processing apparatus for communicating with the first information processing apparatus. The second information processing apparatus includes a control unit configured to periodically acquire information from the first information processing apparatus, and stop periodically acquiring information from the first information processing apparatus if there is a factor for shifting the power state of the first information processing apparatus into the second power state, and a first transmission unit configured to transmit information in a case where the control unit stops periodically acquiring information from the first information processing apparatus. The first information processing apparatus includes a shifting unit configured to shift the power state of the first information processing apparatus into the second power state if there is the factor for shifting the power state of the first information processing apparatus into the second power state and the information transmitted from the first transmission unit is received from the second information processing apparatus.

Further features of the present invention will become apparent from the following description of exemplary embodiments with reference to the attached drawings.

DESCRIPTION OF THE EMBODIMENTS

<Overall Configuration of Image Forming System>

Figure 1:
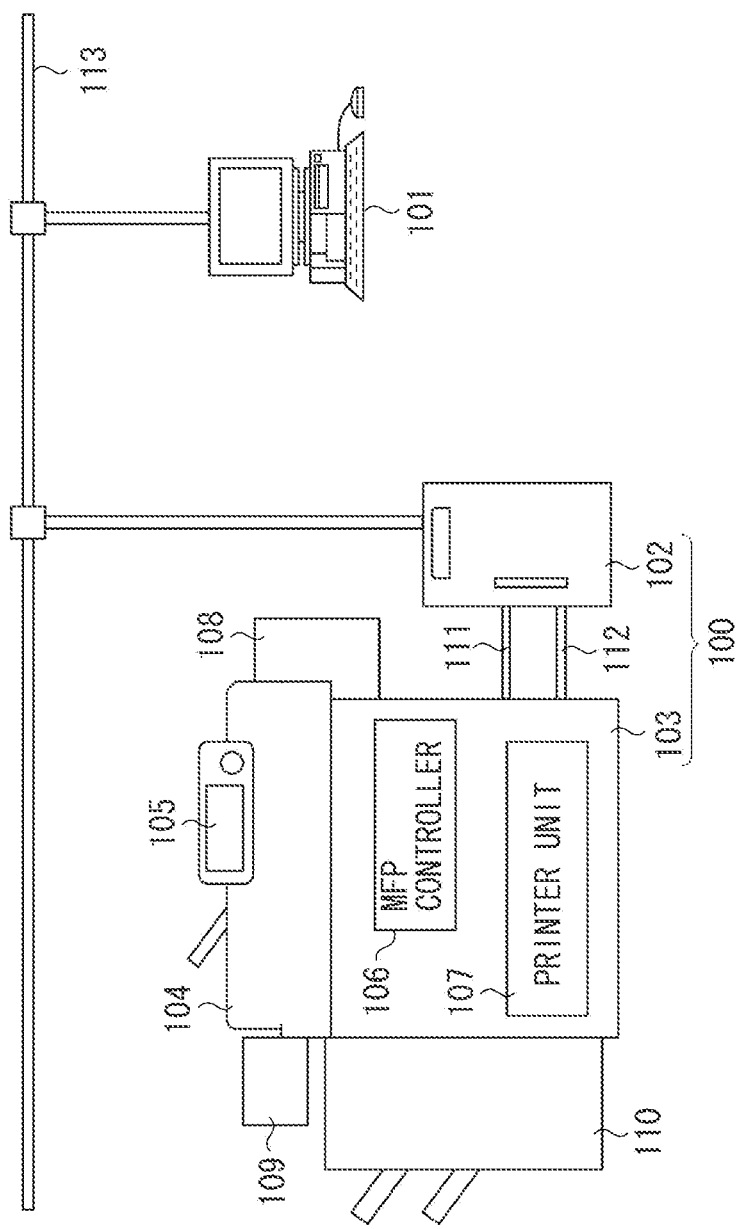
FIG. 1 illustrates an overall configuration of an image forming system.

FIG. 1 is a block diagram illustrating an overall configuration of an image forming system 100.

The image forming system (i.e., an information processing system) 100 includes an image processing controller (i.e., a second information processing apparatus) 102 and an image forming apparatus (i.e., a first information processing apparatus) 103. The image forming system 100 is connected to a client computer 101 in such a way as to communicate with each other. The client computer 101 is connected to the image processing controller 102 via an Ethernet (registered trademark) cable 113 in such a way as to communicate with each other. Further, the image processing controller 102 is connected to the image forming apparatus 103 via a control cable 111 and an image video cable 112. Further, according to the present exemplary embodiment, the image forming apparatus 103 is not directly connected to the Ethernet (registered trademark) cable 113. More specifically, the image forming apparatus 103 can communicate with the client computer 101 via the image processing controller 102. However, the image forming apparatus 103 can be directly connected to the Ethernet (registered trademark) cable 113. In other words, the image forming apparatus 103 can be connected to the client computer 101 in such a way as to perform direct communications with each other.

The client computer 101 can launch an application to instruct the image forming apparatus 103 to perform print processing.

The image processing controller 102 and the image forming apparatus 103 are cooperatively operable to perform image processing.

The image forming apparatus 103 is a multiple function peripheral (MFP).

<Configuration of Image Forming Apparatus>

Figure 2:
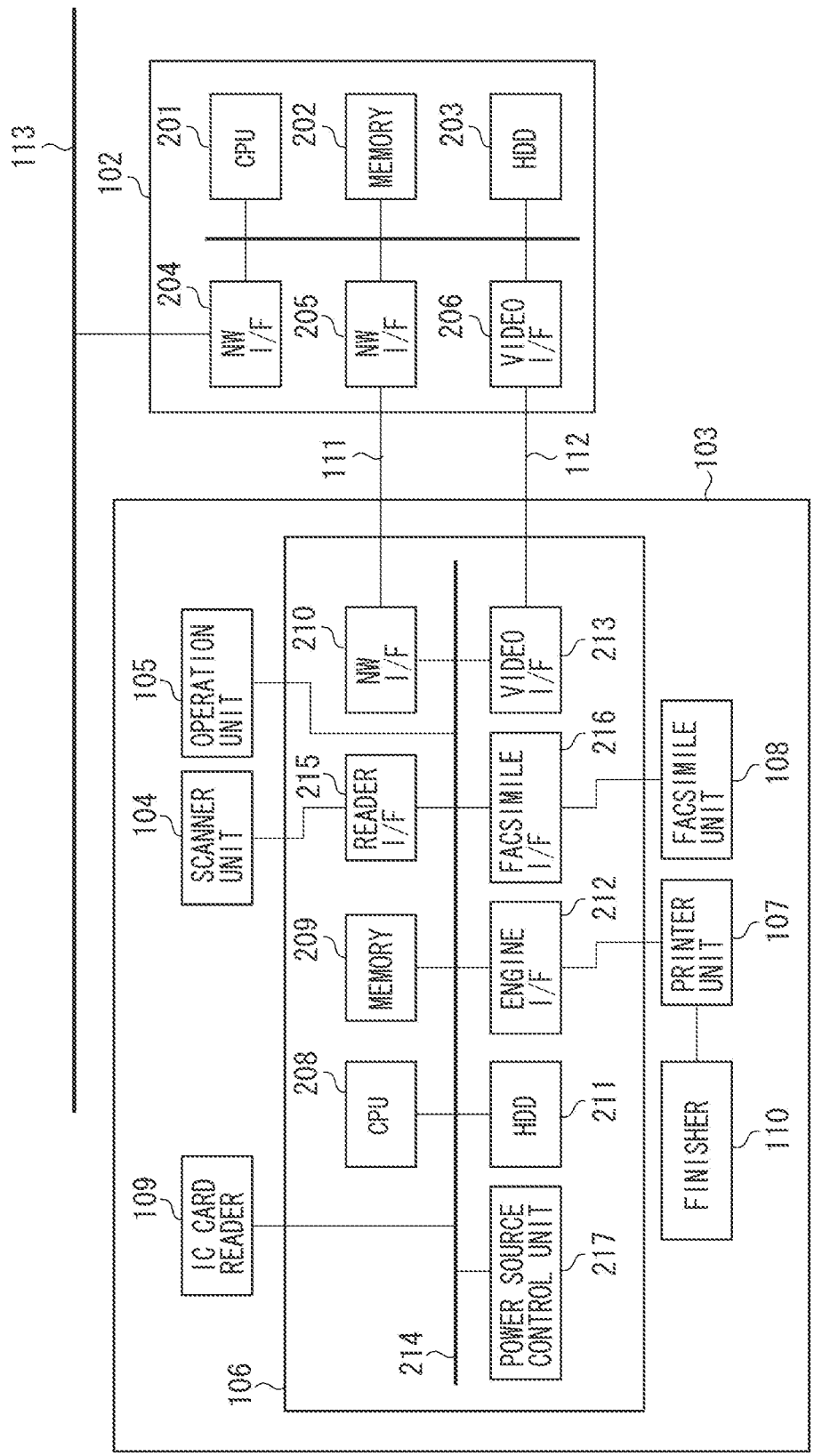
FIG. 2 is a block diagram illustrating a hardware configuration of an image forming apparatus and an image processing controller that are included in the image forming system.

FIG. 2 is a block diagram illustrating a hardware configuration of the image forming apparatus 103 and the image processing controller 102.

The image forming apparatus 103 includes a scanner unit 104, an operation unit 105, an MFP controller 106, a printer unit 107, a facsimile unit 108, an integrated circuit (IC) card reader 109, and a finisher 110. The scanner unit 104 can read a document and input image data of the read document. The operation unit 105 includes various keys and a panel. The operation unit 105 can receive various instructions from a user via various keys. Further, the operation unit 105 can display various types of information on the panel. The MFP controller 106 can control the above-described scanner unit 104 and the printer unit 107. Operations that can be performed by the MFP controller 106 are described in detail below. The printer unit 107 can perform printing on a sheet based on image data. The facsimile unit 108 is connected to a telephone line (not illustrated) and performs facsimile input/output processing via the telephone line. The IC card reader 109 can read user identification information from an IC card. The finisher 110 can receive a sheet on which an image is formed by the printer unit 107 and perform processing, such as sheet discharge, sort, staple, punch, and cutting on the received sheet.

The image forming apparatus 103 having the above-described configuration can realize the following functions.

A copy function for storing image data of a document read by the scanner unit 104 in a hard disk drive (HDD) 211 and causing the printer unit 107 to perform printing on a sheet based on the read image data, a SEND function for transmitting image data of a document read by the scanner unit 104 to the client computer 101 via a network, a BOX function for storing image data of a document read by the scanner unit 104 in the HDD 211, and storing image data transmitted from the client computer 101 in the HDD 211, and a print function for causing the printer unit 107 to interpret and print page description language (PDL) data received from the client computer 101.

<Details of MFP Controller of Image Processing Apparatus>

The MFP controller 106 of the image forming apparatus 103 is described in detail below with reference to FIG. 2.

The MFP controller 106 of the image forming apparatus 103 includes a central processing unit (CPU) 208, a memory 209, a network interface (I/F) 210 (i.e., a second transmission unit), the HDD 211, an engine I/F 212, a video I/F 213, a reader I/F 215, a facsimile I/F 216, and a power source control unit 217. The CPU 208 can control each constituent component of the image forming apparatus 103 via a system bus 214. Further, the CPU 208 can perform calculations and execute programs stored in a storage device (e.g., memory 209 or HDD 211). The memory 209 is usable as a work memory for the CPU 208. The network I/F 210 can transmit and receive control commands to and from the image processing controller 102 via the control cable 111. The HDD 211 is a large-capacity storage device and stores various control programs and image data that can be executed by the CPU 208. The engine I/F 212 can transmit and receive control commands to and from the printer unit 107. The video I/F 213 can transmit and receive image data to and from the image processing controller 102 via the image video cable 112. The reader I/F 215 can transmit and receive control commands to and from the scanner unit 104 and the operation unit 105. The facsimile I/F 216 is connected to the facsimile unit 108. The power source control unit 217 can control power supply to each constituent component of the image forming apparatus 103.

<Details of Image Processing Controller>

As illustrated in FIG. 2, the image processing controller 102 includes a CPU 201, a memory 202, an HDD 203, a network I/F 204, a network I/F 205, and a video I/F 206 (i.e., a first transmission unit). The CPU 201 can control each constituent component of the image processing controller 102 via a system bus 207. Further, the CPU 201 can perform calculations and execute programs stored in a storage device (e.g., memory 202 or HDD 203). The memory 202 is usable as a work memory for the CPU 201. The HDD 203 is a large-capacity storage device and can store various control programs and image data that can be executed by the CPU 201. The network I/F 204 can communicate with an external apparatus (e.g., client computer 101) via the Ethernet (registered trademark) cable 113. The network I/F 205 can transmit and receive control commands to and from the image forming apparatus 103 via the control cable 111. The video I/F 206 can transmit and receive image data to and from the image forming apparatus 103 via the image video cable 112.

<Power Source Circuit of Image Forming Apparatus>

Figure 3:
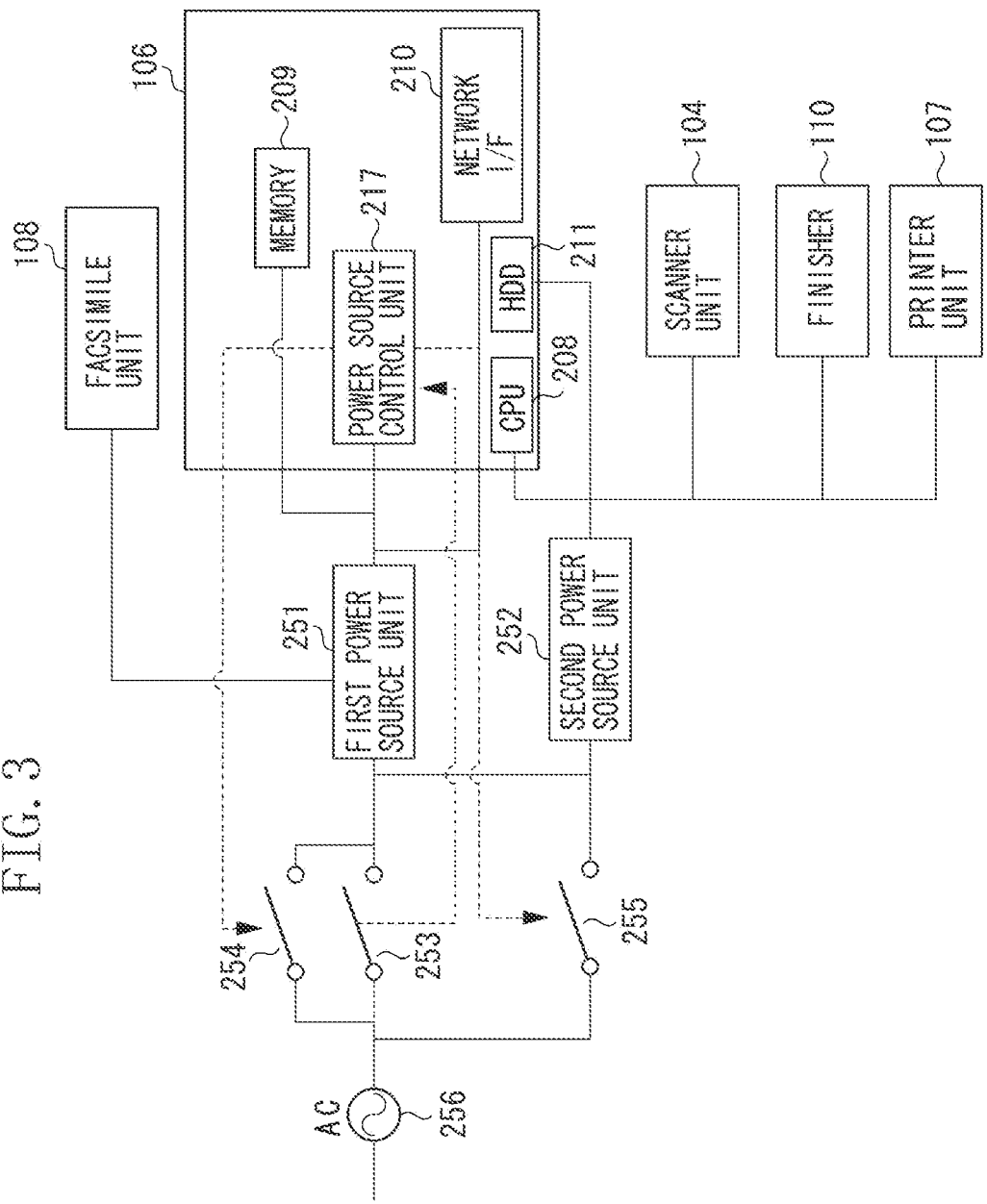
FIG. 3 is a power source circuit diagram of the image forming apparatus.

FIG. 3 is a power source circuit diagram of the image forming apparatus.

Next, a power source configuration of the image forming apparatus 103 is described in detail below with reference to FIG. 3.

The image forming apparatus 103 includes a small-capacity power source unit (hereinafter, referred to as a first power source unit) 251 and a large-capacity power source unit (hereinafter, referred to as a second power source unit) 252. The first power source unit 251 can convert alternate current (AC) power supplied from an AC power source 256 into direct current (DC) power (e.g., 3.3 V). The converted DC power can be supplied to the facsimile unit 108, the power source control unit 217, the memory 209, the network I/F 210, and so on. The second power source unit 252 can convert AC power supplied from the AC power source 256 into DC power (e.g., 12 V or 24 V). The converted DC power can be supplied to the printer unit 107, the scanner unit 104, the finisher 110, the CPU 208, the HDD 211, and so on. A seesaw switch 253 and a relay 254 are provided between the AC power source 256 and the first power source unit 251. In addition, a relay 255 is provided between the AC power source 256 and the second power source unit 252. The seesaw switch 253 is brought into an ON state or an OFF state according to a user operation. The operational state (OFF state or ON state) of the seesaw switch 253 is notified to the power source control unit 217.

The power source control unit 217 can detect the operational state (ON state or OFF state) of the seesaw switch 253. Further, the power source control unit 217 can bring each of the relays 254 and 255 into an ON or OFF state.

When the power source control unit 217 turns on the relay 254 and the relay 255, the first power source unit 251 and the second power source unit 252 can supply electric power to each constituent component, such as the printer unit 107, the scanner unit 104, and the finisher 110. Thus, the image forming apparatus 103 is brought into a standby state. When the power source control unit 217 turns on the relay 254 and turns off the relay 255, the second power source unit 252 stops supplying electric power to the printer unit 107 the scanner unit 104, and the like. Thus, the image forming apparatus 103 is brought into a power saving state 404. In the power saving state 404, electric power can be supplied to the limited components, such as the power source control unit 217, the memory 209, and the network I/F 210, and no power is supplied to other components.

<Software Configuration of Image Processing Controller>

Figure 4:
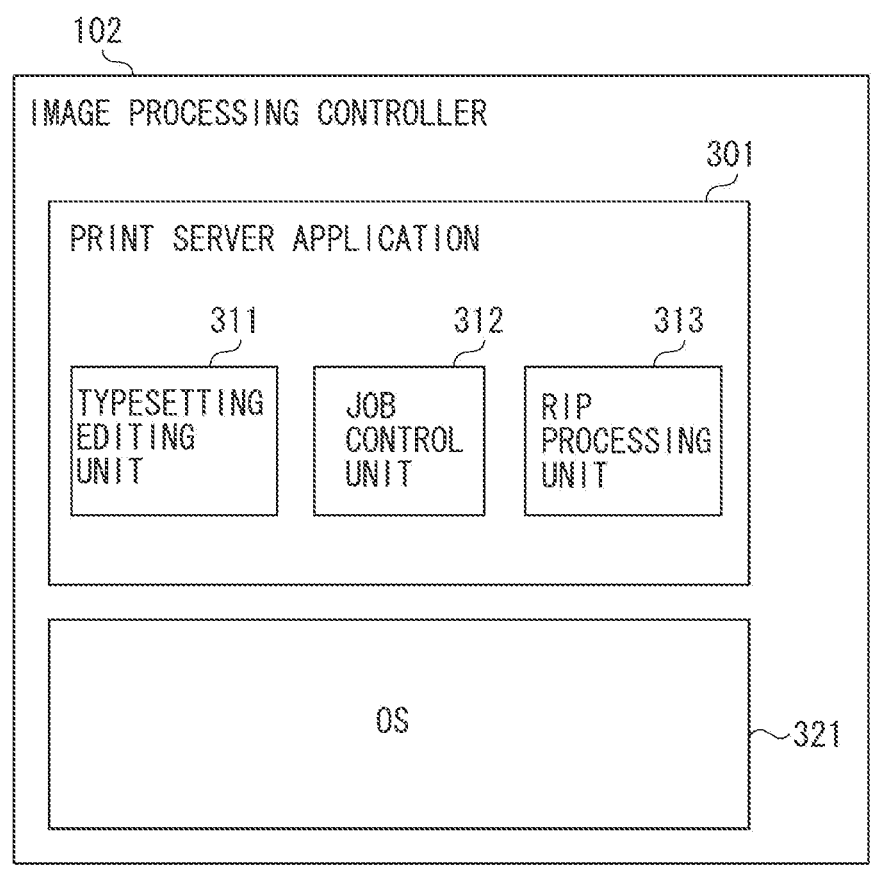
FIG. 4 is a block diagram illustrating a software configuration of the image processing controller.

FIG. 4 is a block diagram illustrating a software configuration of the image processing controller 102.

Next, the software configuration of the image processing controller 102 is described in detail below with reference to FIG. 4.

To realize the software configuration illustrated in FIG. 4, the CPU 201 reads and executes a program stored in the memory 202 or the HDD 203 of the image processing controller 102.

An operating system (OS) 321 is a basic software of the image processing controller 102. A print server application 301 is application software operating on the OS 321 which is executed by the CPU 201. The print server application 301 includes a typesetting editing unit 311, a job control unit 312, and a raster image processor (RIP) processing unit 313, and performs various types of processing (including image processing).

The typesetting editing unit 311 is an editing unit for performing typesetting editing processing for editing image data of each page according to a bookbinding typesetting format based on an instruction from the client computer 101. The job control unit 312 is a control unit for controlling a print job based on an instruction from the client computer 101. More specifically, the job control unit 312 receives print data from the client computer 101 and performs a print order control for a print job according to an instruction from the client computer 101. The RIP processing unit 313 is a processing unit for converting a page description language (PDL) into a printable raster image when the typesetting editing unit 311 performs typesetting processing or when the job control unit 312 performs actual image forming processing.

<Transition of Power State in Image Forming Apparatus>

Figure 5:
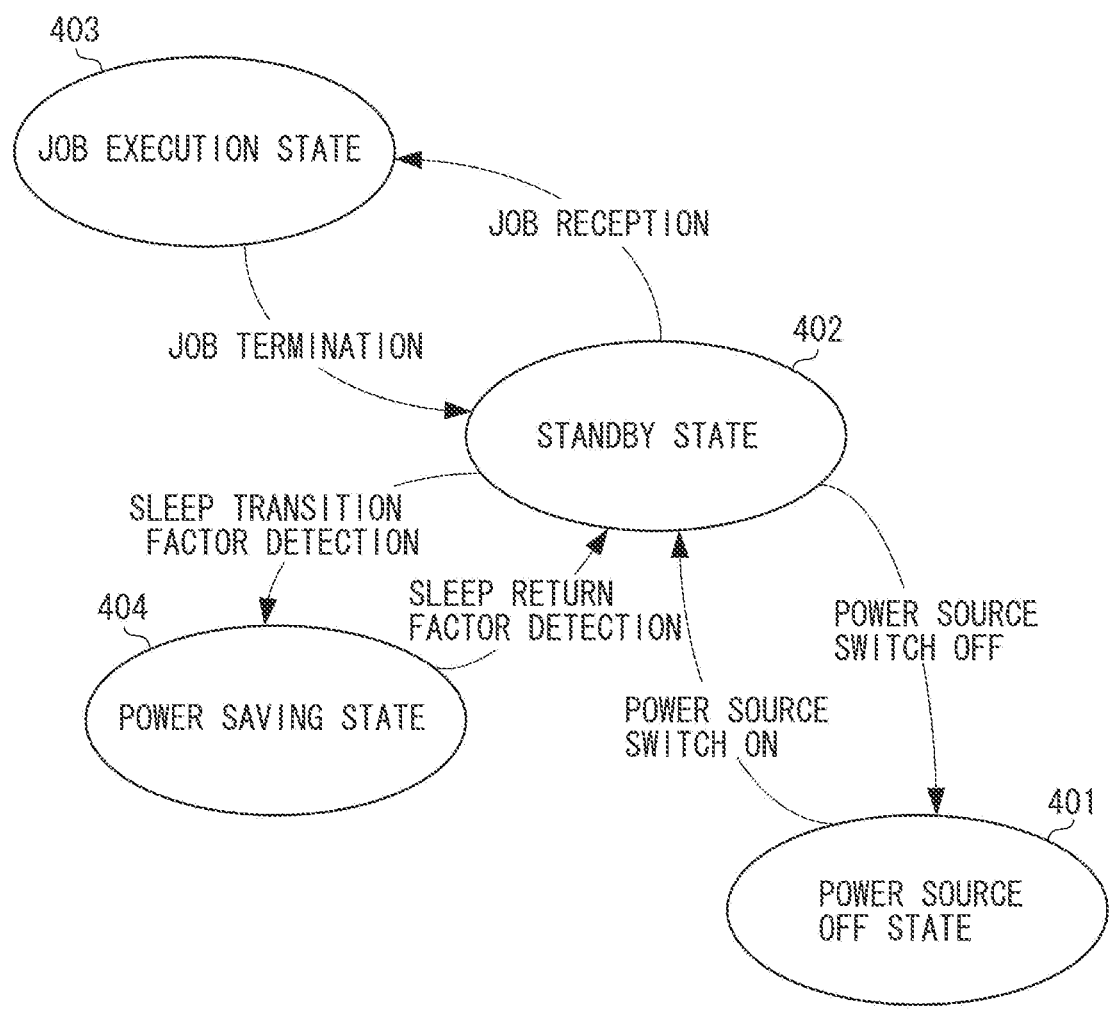
FIG. 5 is a state transition diagram illustrating transition of a power state in the image forming apparatus.

FIG. 5 is a state transition diagram illustrating transition of a power state in the image forming apparatus 103.

The image forming apparatus 103 according to the present exemplary embodiment can take any one of power states including a power source OFF state 401, a standby state (hereinafter, referred to as "first power state") 402, a job execution state 403, and a power saving state (hereinafter, referred to as "second power state") 404. However, the present invention is not limited to the above-described four power states. The image forming apparatus 103 according to the present exemplary embodiment can take any other power state. For example, the image forming apparatus 103 can be a suspended state or a hibernation state. The suspended state is a state in which the image forming apparatus 103 can promptly return to the standby state 402. In the suspended state, electric power is constantly supplied to the memory 209. Thus, the image forming apparatus 103 can shift to the standby state 402 with reference to the status of the image forming apparatus 103 stored in the memory 209. The hibernation state is also a state in which the image forming apparatus 103 can promptly return to the standby state 402. The hibernation state is similar to the power source OFF state 401 in that no electric power is supplied to each constituent component of the image forming apparatus 103. However, the hibernation state is different from the power source OFF state 401 in that the status of the image forming apparatus 103 can be stored in the HDD 211 before the power state shifts into the hibernation state. Thus, the image forming apparatus 103 can promptly return from the hibernation state to the standby state based on the information stored in the HDD 211.

With respect to largeness in power consumption, the respective power states of the image forming apparatus 103 satisfy the following relationship. Job execution state 403>Standby state 402>Power saving state 404>Power source OFF state 401

The power source OFF state 401 indicates an operational state in which the seesaw switch 253 of the image forming apparatus 103 is brought into an OFF state. Therefore, no electric power is supplied to each constituent component of the image forming apparatus 103. If a user turns on the seesaw switch 253 in the power source OFF state 401, the image forming apparatus 103 shifts its operational state into the standby state 402.

The standby state 402 indicates an operational state in which the image forming apparatus 103 is ready for executing a job, and electric power is supplied to all constituent components of the image forming apparatus 103. In the standby state 402, electric power is not necessarily supplied to all components in the image forming apparatus 103. For example, it is useful to supply electric power to only essential components and supply no power to the remaining components (e.g., the operation unit 105). If the image forming apparatus 103 receives a job from the client computer 101 via the image processing controller 102 in the standby state 402, the image forming apparatus 103 changes its operational state into the job execution state 403. Further, if a sleep transition factor is detected in the standby state 402, the image forming apparatus 103 changes its operational state into the power saving state 404.

The following actions are examples of the sleep transition factor.

A user presses a sleep transition button (not illustrated),
a predetermined time has elapsed in a state where a print job or a scan job is not executed in the standby state 402, and
a predetermined time has elapsed in a state where the client computer 101 does not access a remote UI of the image forming apparatus 103.

Further, if a user turns off the seesaw switch 253 in the standby state 402, the image forming apparatus 103 executes shutdown processing and changes its operational state into the power source OFF state 401. The shutdown processing includes terminating the OS and applications to deactivate the image forming apparatus 103.

The job execution state 403 indicates an operational state in which the image forming apparatus 103 is currently executing a job, and electric power is supplied to all constituent components of the image forming apparatus 103. Similarly, in the job execution state 403, electric power is not necessarily supplied to all components in the image forming apparatus 103. For example, it is useful to supply electric power to only essential components and supply no power to the remaining components (e.g., the operation unit 105). Further, it is useful to supply no power to a constituent component which is not used in the execution of a job. More specifically, when the image forming apparatus 103 is currently executing a print job to form an image on a sheet, it is useful to stop supplying electric power to the operation unit 105 and the scanner unit 104 which are not used in the print job. If the image forming apparatus 103 completes the execution of the job in the job execution state 403, its operational state shifts into the standby state 402.

The power saving state 404 indicates an operational state in which the image forming apparatus 103 stands by in a power saving mode, and electric power is supplied to only a part of the MFP controller 106 including the network I/F 210 of the image forming apparatus 103. In the power saving state 404, the power supply to the scanner unit 104, the printer unit 107, and the operation unit 105 is stopped. If the image forming apparatus 103 receives a sleep return factor in the power saving state 404, the image forming apparatus 103 shifts its operational state to the standby state 402. The network I/F 210 has a proxy response function of responding to a simple packet transmitted via a network while maintaining the power saving state 404. Packet for an Address Resolution Protocol (ARP) request, Simple Network Management Protocol (SNMP) state acquisition, Internet Control Message Protocol (ICMP) neighbor discovery are examples of the simple packet.

The following actions are examples of the sleep return factor.

A user presses a sleep return button, and the client computer 101 receives a job.

<Operation of Image Forming Apparatus in Transition to Power Saving State>

Figure 6:
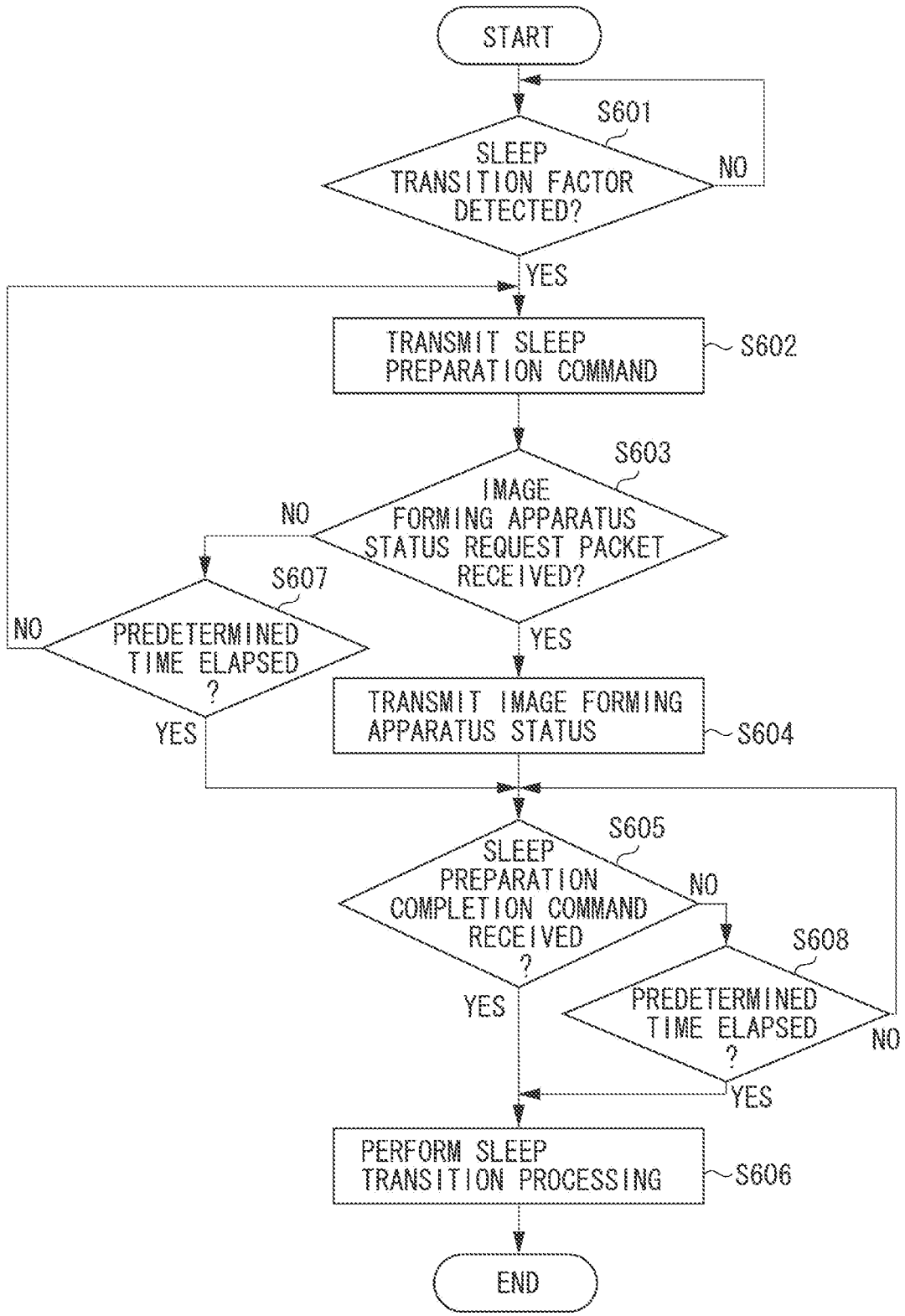
FIG. 6 is a flowchart illustrating processing performed by the image forming apparatus when the image forming apparatus shifts its operational state into a power saving state.

FIG. 6 is a flowchart illustrating operations that can be performed by the image forming apparatus 103 when the image forming apparatus 103 shifts its operational state into the power saving state 404. The operations performed by the image forming apparatus 103 when the image forming apparatus 103 shifts into the power saving state 404 are described in detail below with reference to FIG. 6. To realize the processing of the flowchart illustrated in FIG. 6, the CPU 208 executes a program loaded into the memory 209.

If the image forming apparatus 103 shifts into the standby state 402 after completing the execution of a job, then in step S601, the CPU 208 determines whether a sleep transition factor has been detected. If it is determined that the sleep transition factor has not been detected (NO in step S601), the CPU 208 repeats the determination processing in step S601. If it is determined that the sleep transition factor has been detected (YES in step S601), then in step S602, the CPU 208 causes the network I/F 210 to transmit a sleep preparation command. The sleep preparation command is a command for requesting the image processing controller 102 to stop periodically acquiring information about the image forming apparatus 103 so that the image forming apparatus 103 shifts its operational state into the power saving state 404. In other words, the sleep preparation command requests the image processing controller 102 to stop periodically acquiring management information base (MIB) of the image forming apparatus 103. In step S602, the sleep preparation command is transmitted to the image processing controller 102 via the control cable 111.

Then, in step S603, the CPU 208 determines whether an acquisition request packet designating the status of the image forming apparatus 103 has been received from the image processing controller 102. If the CPU 208 determines that the acquisition request packet has been received (YES in step S603), then in step S604, the CPU 208 generates a packet indicating the status of the image forming apparatus 103 and causes the network I/F 210 to transmit the generated packet.

Subsequently, in step S605, the CPU 208 determines whether a sleep preparation completion command has been received from the image processing controller 102 as response information corresponding to the transmitted sleep preparation command. If it is determined that the sleep preparation completion command has been received (YES in step S605), then in step S606, the CPU 208 causes the image forming apparatus 103 to shift its operational state from the standby state 402 to the power saving state 404. More specifically, the CPU 208 instructs the power source control unit 217 to turn off the relay 255. When the relay 255 is turned off, the power supply to the printer unit 107 and the scanner unit 104 is stopped. The CPU 208 performs sleep transition processing before the power supply is stopped by the power source control unit 217. In the sleep transition processing, the CPU 208 stores a state of the image forming apparatus 103 immediately before shifting into the power saving state 404 in the memory 209.

If it is determined that the acquisition request packet designating the status of the image forming apparatus 103 has not been received (NO in step S603), then in step S607, the CPU 208 determines whether a predetermined time has elapsed since the transmission of the sleep preparation command. If it is determined that the predetermined time is not yet elapsed (NO in step S607), then in step S602, the CPU 208 causes the network I/F 210 to transmit the sleep preparation command again. On the other hand, if it is determined that the predetermined time has elapsed (YES in step S607), the CPU 208 does not transmit the status of the image forming apparatus 103 and advances the processing to step S605.

If it is determined that the sleep preparation completion command has not been received (NO in step S605), then in step S608, the CPU 208 determines whether a predetermined time has elapsed. If it is determined that the predetermined time has elapsed (YES in step S608), then in step S606, the CPU 208 performs the sleep transition processing.

<Operation of Image Processing Controller in Transition to Power Saving State>

Figure 7:
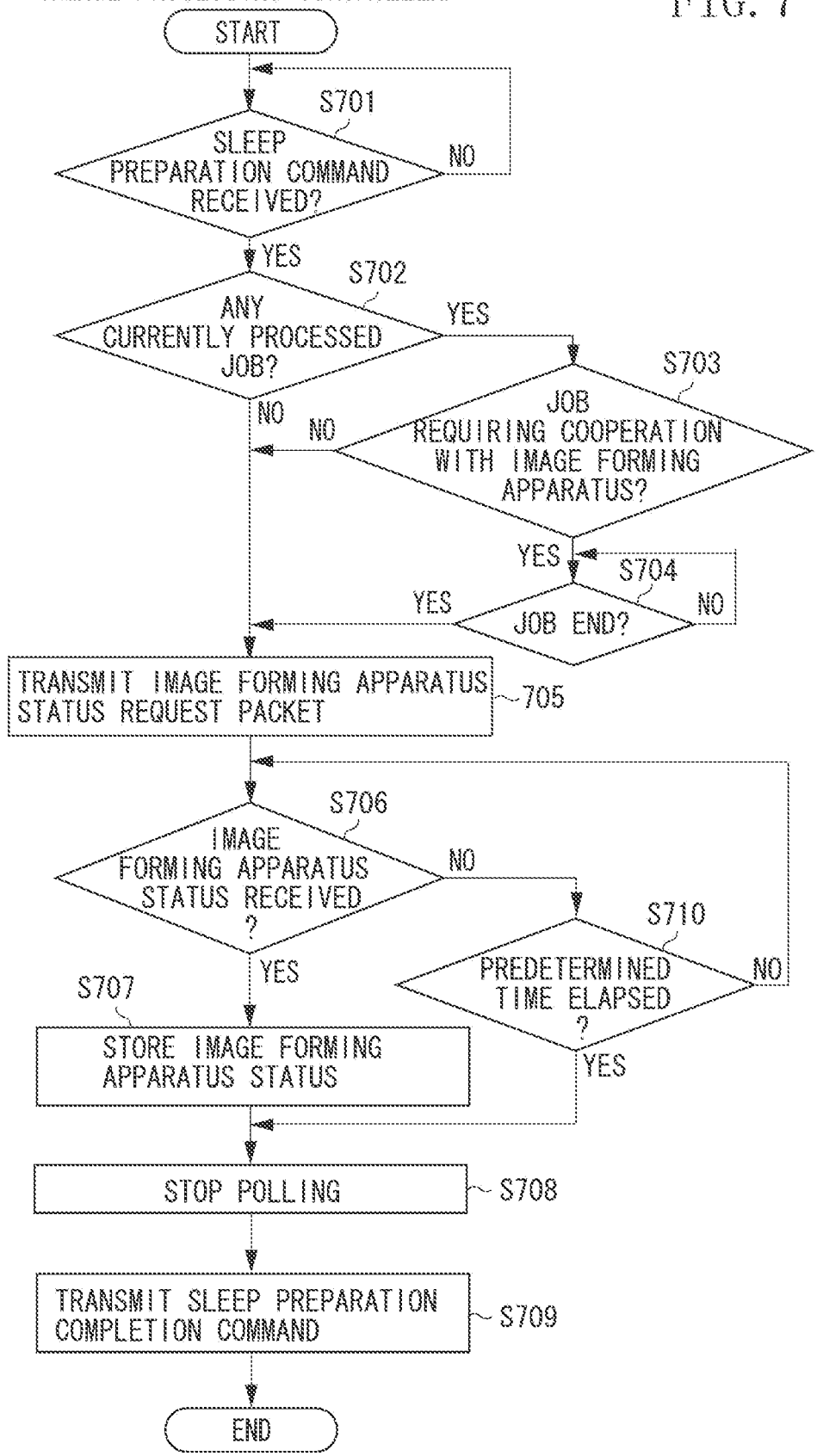
FIG. 7 is a flowchart illustrating processing performed by the image processing controller when the image forming apparatus shifts its operational state into the power saving state.

FIG. 7 is a flowchart illustrating processing performed by the image processing controller 102 when the image forming apparatus 103 shifts its operational state into the power saving state 404. Operations performed by the image processing controller 102 when the image forming apparatus 103 shifts its operational state into the power saving state 404 are described in detail below with reference to FIG. 7. To realize the processing of the flowchart illustrated in FIG. 7, the CPU 201 executes a program loaded into the memory 202.

First, in step S701, the CPU 201 determines whether the sleep preparation command has been received from the image forming apparatus 103. If the sleep preparation command has not been received (NO in step S701), the CPU 201 repeats the determination processing in step S701. If it is determined that the sleep preparation command has been received (YES in step S701), then in step S702, the CPU 201 determines whether a currently processed job is present. If it is determined that there is a currently processed job (YES in step S702), then in step S703, the CPU 201 checks the type of the currently processed job.

More specifically, in step S703, the CPU 201 determines whether the currently processed job requires the image processing controller 102 to cooperate with the image forming apparatus 103. For example, a print job or a scan job is an example of the job that requires the image processing controller 102 to cooperate with the image forming apparatus 103. In addition, a job that is stored in the BOX (i.e., the HDD 211) of the image forming apparatus 103 and not subjected to print processing is the job that requires the image processing controller 102 to cooperate with the image forming apparatus 103. On the other hand, a hold job that requires the image processing controller 102 to perform RIP processing only is a job that does not require the image processing controller 102 to cooperate with the image forming apparatus 103.

If it is determined that the currently processed job requires the image processing controller 102 to cooperate with the image forming apparatus 103 (YES in step S703), then in step S704, the CPU 201 determines whether the currently processed job has been completed. If the currently processed job is not yet completed (NO in step S704), the CPU 201 repeats the determination processing in step S704 until the currently processed job has been completed. If the currently processed job has been completed (YES in step S704), then in step S705, the CPU 201 performs processing as described below.

If the currently processed job is a print job that requires the image processing controller 102 to perform RIP processing and requires the image processing controller 102 to transmit print data to the image forming apparatus 103, the CPU 201 performs control processing in the following manner. The CPU 201 determines that the currently processed job has been completed at the time when the image processing controller 102 completes the RIP processing. Then, if the image processing controller 102 receives a sleep preparation command before the image processing controller 102 transmits image data having been subjected to the RIP processing to the image forming apparatus 103, the image processing controller 102 completes the RIP processing. However, the image processing controller 102 does not transmit the image data having been subjected to the RIP processing to the image forming apparatus 103. Further, if the image processing controller 102 receives a sleep preparation command after starting transmission of the image data having been subjected to the RIP processing to the image forming apparatus 103, the image processing controller 102 does not interrupt the transmission of the image data having been subjected to the RIP processing. After completing the transmission of the image data having been subjected to the RIP processing, the operation of the image processing controller 102 proceeds to step S705.

If it is determined that the currently processed job does not require the image processing controller 102 to cooperate with the image forming apparatus 103 (NO in step S703), then in step S705, the CPU 201 performs processing as described below. If it is determined that there is not any currently processed job (NO in step S702), then in step S705, the CPU 201 performs processing as described below.

In step S705, the CPU 201 causes the network I/F 205 to transmit a device status request packet to acquire information about the status of the image forming apparatus 103.

Then, in step S706, the CPU 201 determines whether the packet indicating the status of the image forming apparatus 103 has been received from the image forming apparatus 103. If it is determined that the packet indicating the status of the image forming apparatus 103 has been received (YES in step S706), then in step S707, the CPU 201 stores the status of the image forming apparatus 103 in the memory 202 or the HDD 203. The status of the image forming apparatus 103 stored in the memory 202 or the HDD 203 includes, for example, sheet tray information (e.g., sheet type, size, and remaining amount).

Then, in step S708, the CPU 201 controls the network I/F 205 in such a way as to cause the image processing controller 102 to stop periodically acquiring information about the image forming apparatus 103. More specifically, the CPU 201 controls the network I/F 205 in such a way as to cause the image processing controller 102 to stop periodically acquiring (for example at intervals of 60 seconds) the MIB of the image forming apparatus 103 by polling. More specifically, the CPU 201 stops acquiring,
    sheet feed stage information (e.g., sheet type and sheet size),
    a remaining sheet amount,
    a remaining toner amount,
    a location (installation site), and
    sheet discharge information (output bin, with sheet, without sheet, and full load).

According to the present exemplary embodiment, the image processing controller 102 can stop acquiring all of the MIB of the image forming apparatus 103 or can stop acquiring a part of the MIB of the image forming apparatus 103. The image forming apparatus 103 according to the present exemplary embodiment can respond to the image processing controller 102 without changing the operational state from the power saving state 404 to the standby state 402, if the image processing controller 102 requests acquiring a part of the MIB. (This function is referred to as "proxy response.") In the proxy response, the network I/F 210 of the image forming apparatus 103 responds to an inquiry received from the image processing controller 102. Therefore, according to the present exemplary embodiment, the image processing controller 102 continuously performs acquiring a part of the MIB that is proxy responsible by the image forming apparatus 103, without stopping acquiring all of the MIB.

Then, in step S709, the CPU 201 causes the network I/F 205 to transmit a sleep preparation completion command after the communication between the image forming apparatus 103 and the image processing controller 102 is disconnected. When receiving the sleep preparation completion command, the image forming apparatus 103 shifts its operational state from the standby state 402 to the power saving state 404.

In step S710, if a predetermined time has elapsed without receiving the packet indicating the status of the image forming apparatus 103 after the transmission of the device status request packet in step S705 (YES in step S710), the CPU 201 advances the processing to step S708. In this case, the CPU 201 does not store the state of the image forming apparatus 103 immediately before changing its operational state into the power saving state 404.

The image forming apparatus 103 and the image processing controller 102 operate in the following manner when the image forming apparatus 103 returns from the power saving state 404 to the standby state 402. In the image forming system 100, the image forming apparatus 103 returns from the power saving state 404 to the standby state 402 in response to a trigger from the image forming apparatus 103 or a trigger from the image processing controller 102.

<Operation of Image Forming Apparatus when Sleep Return Factor is Detected by Image Forming Apparatus>

Figure 8:
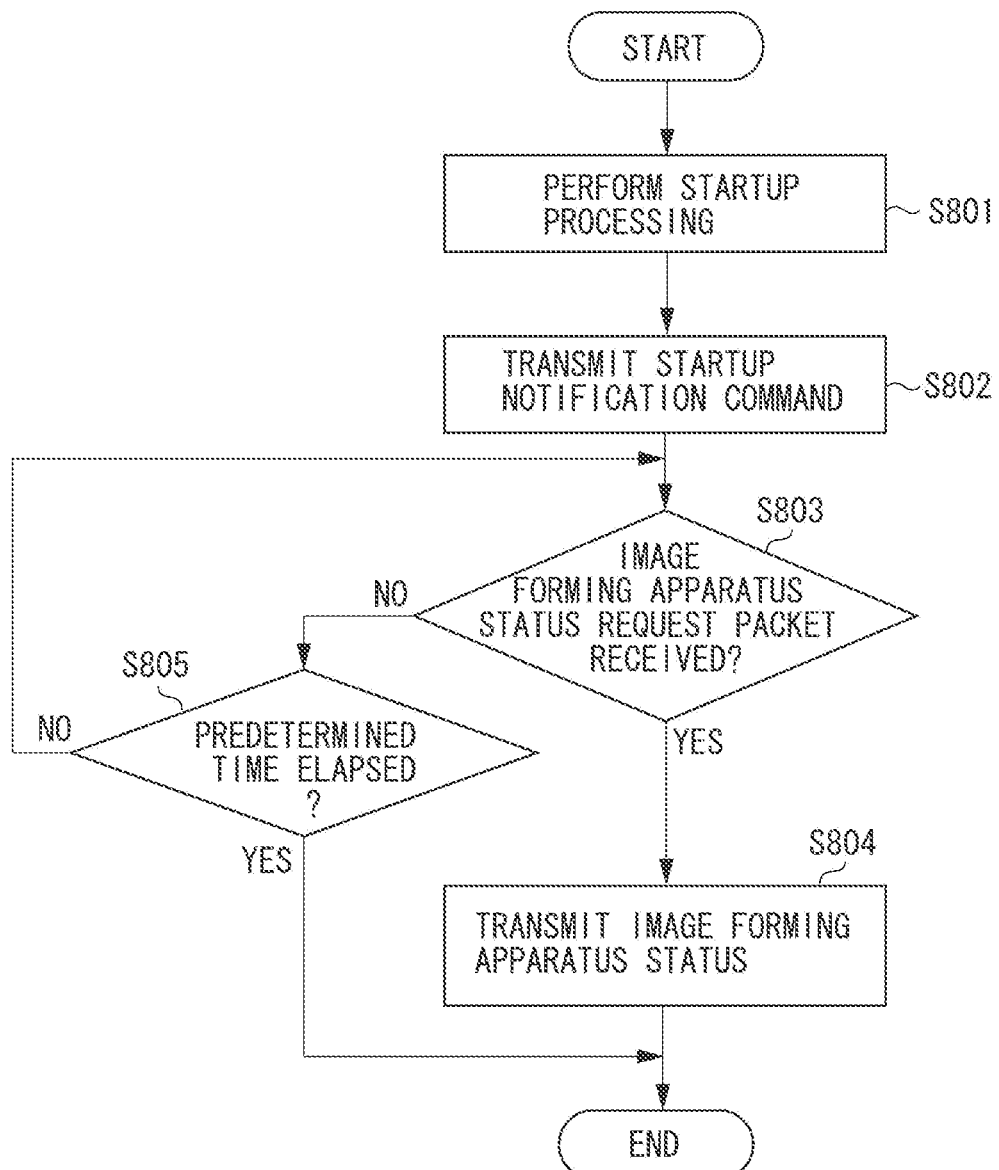
FIG. 8 is a flowchart illustrating processing performed by the image forming apparatus when a sleep return factor is detected by the image forming apparatus.

FIG. 8 is a flowchart illustrating processing performed by the image forming apparatus 103 when a sleep return factor is detected by the image forming apparatus 103. Operations that can be performed by the image forming apparatus 103 when the image forming apparatus 103 shifts its operational state from the power saving state 404 to the standby state 402 are described in detail below with reference to FIG. 8.

In a case where any sleep return factor (for example, when a user presses a sleep return button, when the image forming apparatus 103 receives a job from the client computer 101, when the image forming apparatus 103 receives a facsimile from an external device, or the like) is input to the image forming apparatus 103 which has shifted into the power saving state 404, the power source control unit 217 turns on the relay 255 to supply electric power to the CPU 208. Thus, the image forming apparatus 103 returns its operational state from the power saving state 404 to the standby state 402. In response to the power supply, the CPU 208 executes a program loaded into the memory 209 to realize processing according to the flowchart illustrated in FIG. 8.

In step S801, the CPU 208 which is supplied with electric power performs startup processing. In the startup processing, the CPU 208 causes the image forming apparatus 103 to shift into a previous state being held before the operational state is brought into the power saving state 404, with reference to the status of the image forming apparatus 103 stored in the memory 209. Then, in step S802, the CPU 208 causes the network I/F 210 to transmit a startup notification command.

Subsequently, in step S803, the CPU 208 determines whether an acquisition request packet designating the status of the image forming apparatus 103 has been received from the image processing controller 102. If the CPU 208 determines that the acquisition request packet has been received (YES in step S803), then in step S804, the CPU 208 generates a packet indicating the status of the image forming apparatus 103 and causes the network I/F 210 to transmit the generated packet.

If the CPU 208 determines that the acquisition request packet designating the status of the image forming apparatus 103 has not been received (NO in step S803), then in step S805, the CPU 208 determines whether a predetermined time has elapsed since the transmission of the startup notification command. In step S805, the CPU 208 waits for the predetermined time for the reception of the acquisition request packet designating the status of the image forming apparatus 103. If the acquisition request packet designating the status of the image forming apparatus 103 has not been received during the predetermined time (YES in step S805), the CPU 208 terminates the processing of the flowchart illustrated in FIG. 8 without transmitting the status of the image forming apparatus 103.

<Operation of Image Processing Controller when Sleep Return Factor is Detected by Image Forming Apparatus>

Figure 9:
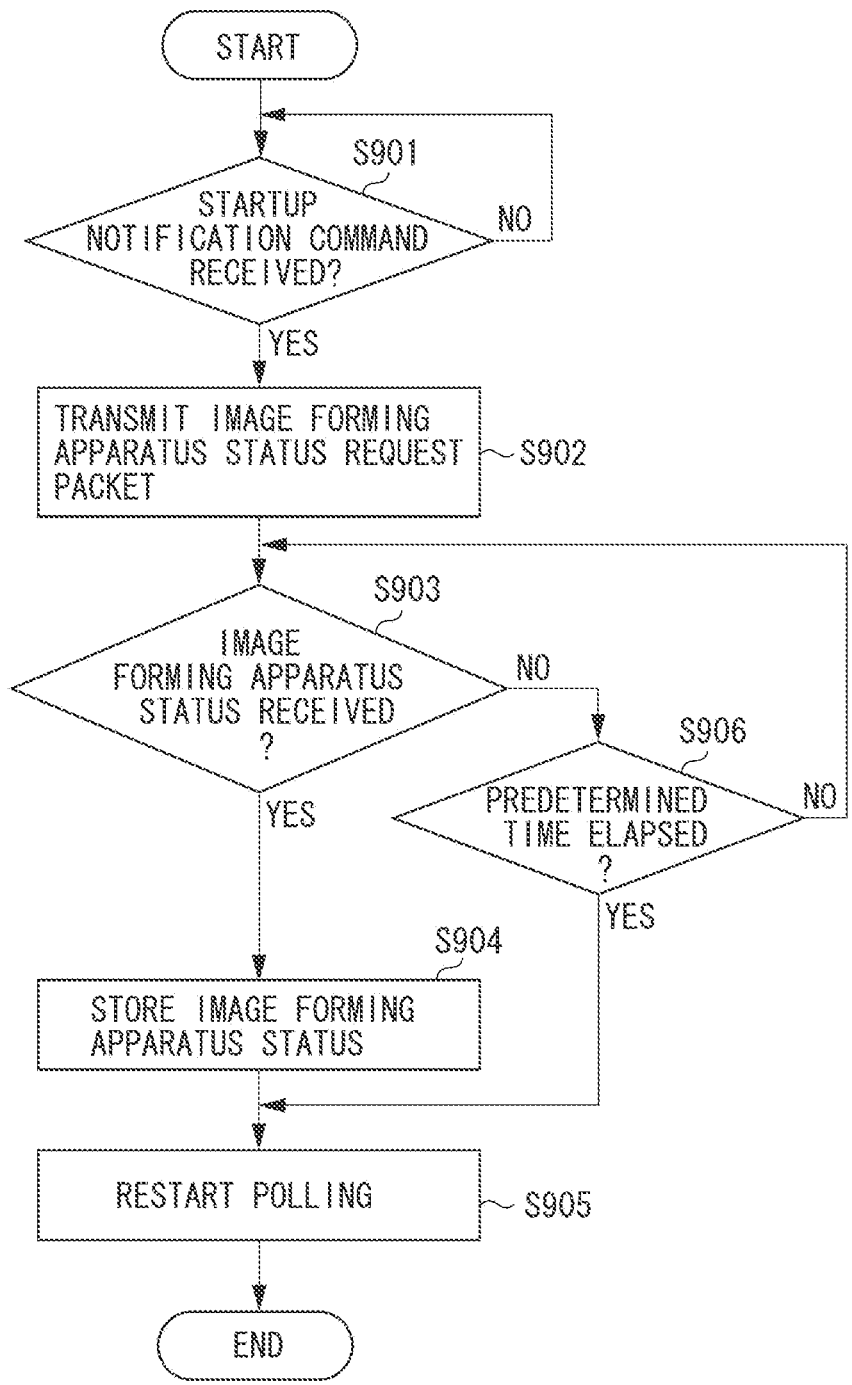
FIG. 9 is a flowchart illustrating processing performed by the image processing controller when a sleep return factor is detected by the image forming apparatus.

FIG. 9 is a flowchart illustrating processing performed by the image processing controller 102 when the image forming apparatus 103 returns from the power saving state 404 to the standby state 402. Operations that can be performed by the image processing controller 102 when the image forming apparatus 103 shifts its operational state from the power saving state 404 to the standby state 402 are described in detail below with reference to FIG. 9. To realize the processing of the flowchart illustrated in FIG. 9, the CPU 201 executes a program loaded into the memory 202.

First, in step S901, the CPU 201 determines whether a startup notification command has been received from the image forming apparatus 103. If the CPU 201 determines that the startup notification command has been received (YES in step S901), then in step S902, the CPU 201 causes the network I/F 205 to transmit a device status request packet to acquire information about the status of the image forming apparatus 103.

Then, in step S903, the CPU 201 determines whether the packet indicating the status of the image forming apparatus 103 has been received from the image forming apparatus 103. If it is determined that the packet indicating the status of the image forming apparatus 103 has been received (YES in step S903), then in step S904, the CPU 201 stores the status of the image forming apparatus 103 in the memory 202 or the HDD 203. The status of the image forming apparatus 103 stored in the memory 202 or the HDD 203 includes, for example, sheet tray information (e.g., sheet type, size, and remaining amount) as a status immediately after the image forming apparatus 103 returns from the power saving state 404.

Next, in step S905, the CPU 201 controls the network I/F 205 in such a way as to enable the image processing controller 102 and the image forming apparatus 103 to restart communications. More specifically, the CPU 201 controls the network I/F 205 to cause the image processing controller 102 to acquire management information base (MIB) of the image forming apparatus 103 periodically (e.g., at intervals of 60 seconds) by polling.

In step S906, if a predetermined time has elapsed since the transmission of the device status request packet without receiving the packet indicating the status of the image forming apparatus 103 (YES in step S906), the CPU 201 advances the processing to step S905. In this case, the CPU 201 cannot store the state immediately after the image forming apparatus 103 returns from the power saving state 404.

<Operation of Image Processing Controller when Sleep Return Factor Occurs in Image Processing Controller>

Figure 10:
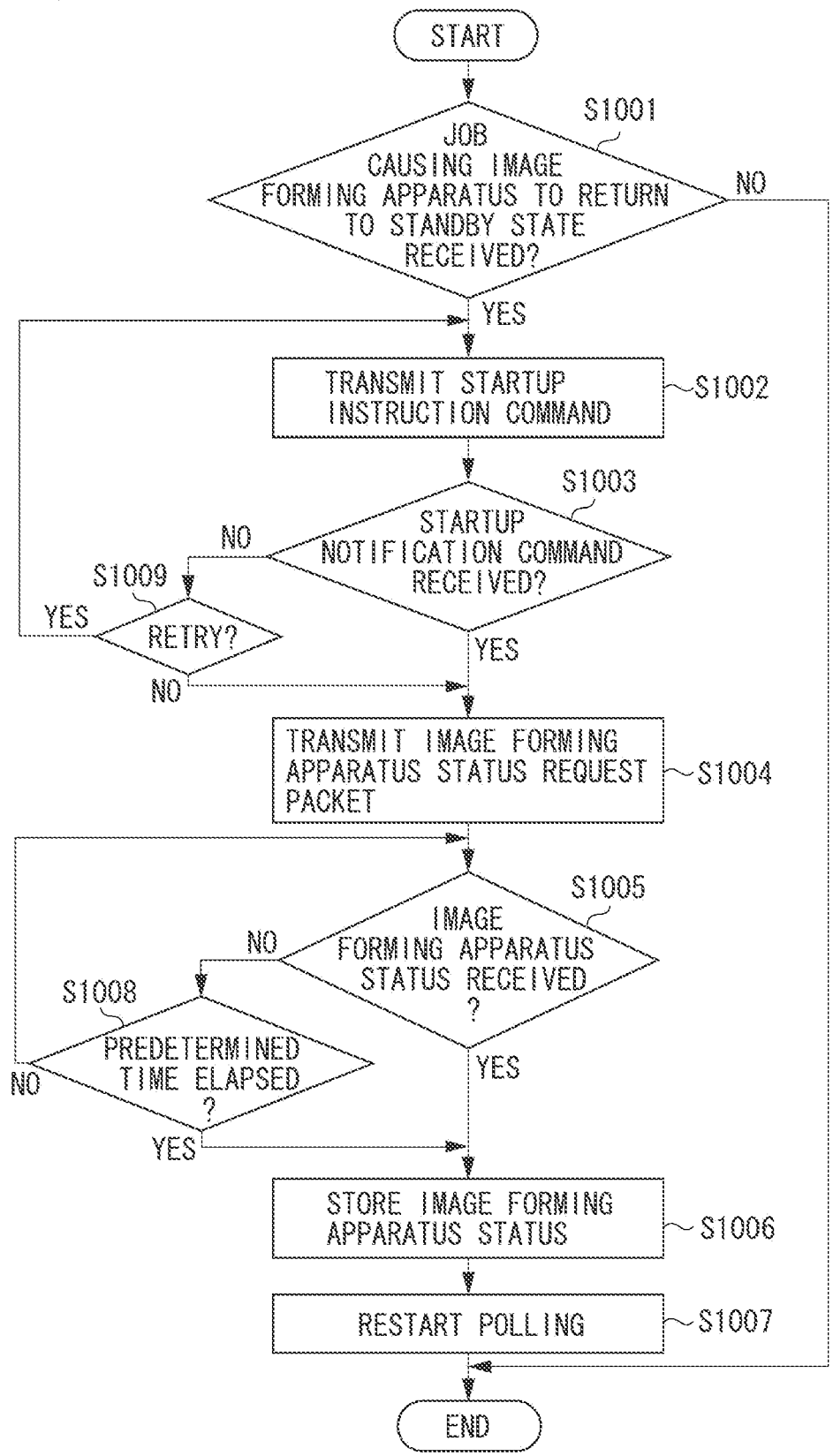
FIG. 10 is a flowchart illustrating processing performed by the image processing controller when a sleep return factor is detected by the image processing controller.

FIG. 10 is a flowchart illustrating processing performed by the image processing controller 102 when the image processing controller 102 causes the image forming apparatus 103 to perform sleep return processing. Operations that can be performed by the image processing controller 102 when the image processing controller 102 causes the image forming apparatus 103 to return from the standby state 402 to the power saving state 404 are described in detail below with reference to FIG. 10. To realize the processing of the flowchart illustrated in FIG. 10, the CPU 201 executes a program loaded into the memory 202.

According to the present exemplary embodiment, the image forming apparatus 103 shifts its operational state from the power saving state 404 to the standby state 402 when the client computer 101 transmits a print job to the image processing controller 102.

If the CPU 201 of the image processing controller 102 receives a job transmitted from the client computer 101, then in step S1001, the CPU 201 determines whether the received job is a job that requires the image forming apparatus 103 to return to the standby state 402. More specifically, if the job received from the client computer 101 is a print job, the CPU 201 determines that the received job requires the image forming apparatus 103 to return to the standby state 402. The print job is a job that causes the image processing controller 102 to perform RIP processing and causes the image forming apparatus 103 to perform printing based on the data having been subjected to the RIP processing.

If the job received from the client computer 101 is a hold job, the CPU 201 determines that the received job does not require the image forming apparatus 103 to return to the standby state 402. The hold job is a job that causes the image processing controller 102 to perform RIP processing and does not cause the image forming apparatus 103 to automatically perform printing. In addition, if the received job requires reading MIB relating to only the image processing controller 102 or if the received job causes the image processing controller 102 to edit a print job, the CPU 201 does not cause the image forming apparatus 103 to return from the power saving state 404.

If it is determined that the received job is a job that does not require the image forming apparatus 103 to return to the standby state (NO in step S1001), the CPU 201 terminates the processing of the flowchart illustrated in FIG. 10 without causing the image forming apparatus 103 to shift into the standby state 402.

On the other hand, if the CPU 201 determines that the received job is a job that requires the image forming apparatus 103 to return to the standby state (YES in step S1001), then in step S1002, the CPU 201 causes the network I/F 205 to transmit a startup instruction command. After the startup instruction command has been transmitted to the image forming apparatus 103, the CPU 201 waits for a response from the image forming apparatus 103.

Then, in step S1003, the CPU 201 determines whether the startup notification command has been received from the image forming apparatus 103. If the CPU 201 determines that the startup notification command has been received (YES in step S1003), then in step S1004, the CPU 201 causes the network I/F 205 to transmit a device status request packet.

In step S1005, the CPU 201 determines whether the packet indicating the status of the image forming apparatus 103 has been received from the image forming apparatus 103. If it is determined that the packet indicating the status of the image forming apparatus 103 has been received (YES in step S1005), then in step S1006, the CPU 201 stores the status of the image forming apparatus 103 in the memory 202 or the HDD 203. The status of the image forming apparatus 103 stored in the memory 202 or the HDD 203 includes, for example, the sheet tray information (e.g., sheet type, size, and remaining amount) as a status immediately after the image forming apparatus 103 returns from the power saving state 404.

Then, in step S1007, the CPU 201 controls the network I/F 205 in such a way as to cause the image processing controller 102 and the image forming apparatus 103 restart communications. More specifically, the CPU 201 controls the network I/F 205 to cause the image processing controller 102 to acquire management information base (MIB) of the image forming apparatus 103 periodically (e.g., at intervals of 60 seconds) by polling.

In step S1008, if a predetermined time has elapsed without receiving the packet indicating the status of the image forming apparatus 103 after the transmission of the device status request packet in step S1004 (YES in step S1008), the CPU 201 advances the processing to step S1007. In this case, the CPU 201 does not store the state immediately after the image forming apparatus 103 returns from the power saving state 404.

In step S1003, if it is determined that the startup notification command has not been received (NO in step S1003), then in step S1009, the CPU 201 determines whether to retry the transmission of the startup instruction command for a predetermined number of times. If the startup notification command cannot be received from the image forming apparatus 103 even after completing the transmission of the startup instruction command for the predetermined number of times (NO in step S1009), the CPU 201 advances the processing to step S1004.

<Operation of Image Forming Apparatus when Sleep Return Factor Occurs in Image Processing Controller>

Figure 11:
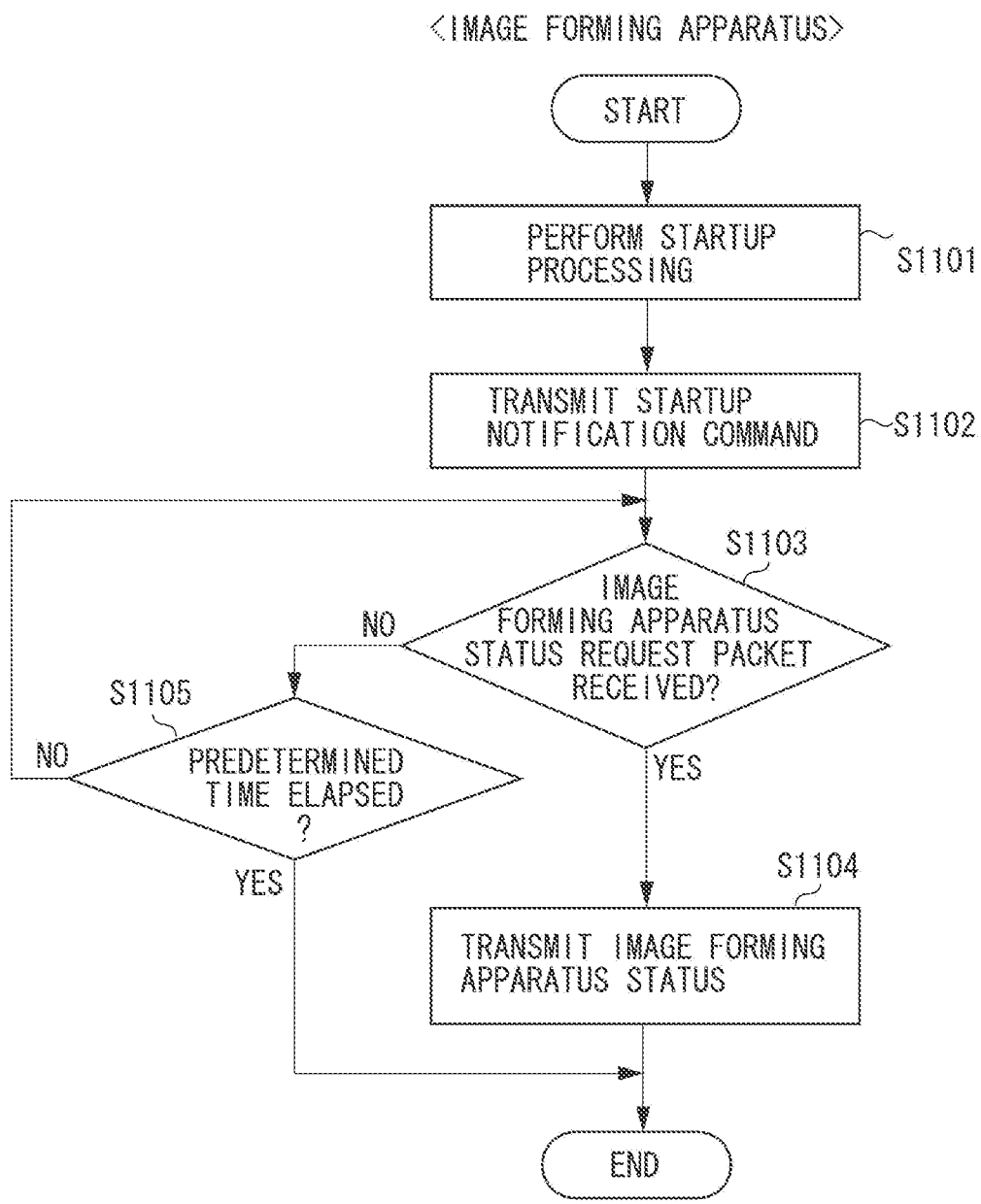
FIG. 11 is a flowchart illustrating processing performed by the image forming apparatus when a sleep return factor is detected by the image processing controller.

FIG. 11 is a flowchart illustrating processing performed by the image forming apparatus 103 when the image processing controller 102 causes the image forming apparatus 103 to return from the power saving state 404. Operations that can be performed by the image forming apparatus 103 when the image processing controller 102 causes the image forming apparatus 103 to return from the power saving state 404 to the standby state 402 are described in detail below with reference to FIG. 11.

When the image forming apparatus 103 is in the power saving state 404, electric power is supplied to the network I/F 210 although no electric power is supplied to the CPU 208. If the network I/F 210 receives the above-described startup instruction command transmitted in step S1002, the power source control unit 217 turns on the relay 255 to supply electric power to the CPU 208 and the like. Thus, the image forming apparatus 103 return its operational state from the power saving state 404 to the standby state 402. In response to the power supply, the CPU 208 executes a program loaded into the memory 209 to realize processing according to the flowchart illustrated in FIG. 11.

If electric power is supplied to the CPU 208, then in step S1101, the CPU 208 performs startup processing. In the startup processing, the CPU 208 causes the image forming apparatus 103 to shift into a previous state being held before the operational state is brought into the power saving state 404, with reference to the status of the image forming apparatus 103 stored in the memory 209. Then, in step S1102, the CPU 208 causes the network I/F 210 to transmit a startup notification command.

Subsequently, in step S1103, the CPU 208 determines whether an acquisition request packet designating the status of the image forming apparatus 103 has been received from the image processing controller 102. If the CPU 208 determines that the acquisition request packet has been received (YES in step S1103), then in step S1104, the CPU 208 generates a packet indicating the status of the image forming apparatus 103 and causes the network I/F 210 to transmit the generated packet.

If it is determined that the acquisition request packet has not been received (NO in step S1103), then in step S1105, the CPU 208 determines whether a predetermined time has elapsed since the transmission of the startup notification command. In step S1105, the CPU 208 waits for the predetermined time for the reception of the acquisition request packet. If the acquisition request packet has not been received during the predetermined time (YES in step S1105), the CPU 208 terminates the processing of the flowchart illustrated in FIG. 11 without transmitting the status of the image forming apparatus 103.

<Inquiry from Client Computer>

A job management tool which can display, edit, and print a print job stored in the image processing controller 102 from the client computer 101 can acquire information relating to the image forming apparatus 103. If the job management tool confirms the sheet tray settings and the remaining sheet amount of the image forming apparatus 103 when the image forming apparatus 103 is in the power saving state 404, the image processing controller 102 does not send any inquiry to the image forming apparatus 103. The image processing controller 102 transmits information about the image forming apparatus 103 (see steps S705 to S707) acquired immediately before shifting the operational state into the power saving state to the job management tool. Thus, the job management tool (i.e., the client computer 101) can display the status of the image forming apparatus 103.

A printer driver installed in the client computer 101 has a bidirectional communication function of acquiring a device configuration of accessories or sheet information of the image forming apparatus 103. In the power saving state 404, as described above, the image processing controller 102 transmits the information about the image forming apparatus 103 (see steps S705 to S707) acquired immediately before shifting into the power saving state without sending any inquiry to the image forming apparatus 103. However, in a case where the information about the image forming apparatus 103 acquired immediately before shifting into the power saving state 404 is updated, the image processing controller 102 causes the image forming apparatus 103 to return its operational state from the power saving state 404 to the standby state 402 and updates the information.

According to the present exemplary embodiment, the image forming apparatus 103 causes the image processing controller 102 to stop periodically acquiring the MIB of the image forming apparatus 103 before the image forming apparatus 103 changes its operational state to the power saving state 404. After the image processing controller 102 stops periodically acquiring the MIB of the image forming apparatus 103, the image forming apparatus 103 changes its operational state from the standby state 402 to the power saving state 404. Thus, the image forming apparatus 103 does not return from the power saving state 404 to the standby state 402 due to periodical acquisition of the MIB by the image processing controller 102. Accordingly, it is feasible to realize power saving for the image forming apparatus 103.

According to the above-described exemplary embodiment, the image forming apparatus 103 causes the image processing controller 102 to stop periodically acquiring the MIB of the image forming apparatus 103 when the image forming apparatus 103 shifts into the power saving state 404. However, the present invention is not limited to the above-described example. For example, not only stopping the above-described periodical MIB acquisition, the image forming apparatus 103 may stop periodically communicating with the image processing controller 102, when the operational state shifts from the standby state 402 to the power saving state 404.

Further, according to the above-described exemplary embodiment, if the image forming apparatus 103 receives a print job from the image processing controller 102, or if a user operates the operation unit 105, the image forming apparatus 103 immediately shifts its operational state from the power saving state 404 to the standby state 402. However, the present invention is not limited to the above-described example. For example, in the present disclosure, if a time duration of the power saving state 404 is shorter than a predetermined time, the image forming apparatus 103 may delay the shift to the standby state 402, even if the image forming apparatus 103 receives a print job from the image processing controller 102 or if a user operates the operation unit 105.

Further, according to the above-described exemplary embodiment, the image processing controller 102 causes the image forming apparatus 103 to return its operational state from the power saving state 404 to the standby state 402 depending on whether a received job requires the image processing controller 102 to cooperate with the image forming apparatus 103. However, the present invention is not limited to the above-described example. For example, in the present disclosure, it is feasible to prevent the image forming apparatus 103 from returning from the power saving state 404 to the standby state 402 when the image processing controller 102 "acquires" the status of the image forming apparatus 103. Further, it is feasible to cause the image forming apparatus 103 to return from the power saving state 404 to the standby state 402 when the image processing controller 102 "sets" the status of the image forming apparatus 103.

The CPU 201 or the CPU 208 can be replaced by a control circuit that is designed to perform processing based on each flowchart.

Further, each function of the flowchart can be executed by a single CPU or by a plurality of CPUs.

According to the above-described configuration, in a case where the first information processing apparatus is brought into the second power state, it is feasible to cause the second information processing apparatus to stop periodically communicating with the first information processing apparatus. Therefore, even when the first information processing apparatus shifts into the second power state, the first information processing apparatus can be prevented from returning from the second power state due to periodical communications.

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-191433 filed Aug. 31, 2012, which is hereby incorporated by reference herein in its entirety.

What is claimed is:

1. An image forming system comprising:
an image forming apparatus configured to form an image on a sheet based on image data, and an image processing apparatus configured to receive a print data from an external device, generate image data based on the print data, and send the image data to the image forming apparatus,
wherein the image processing apparatus includes:
first interface configured to send a plurality of requests to the image forming apparatus,
wherein the image forming apparatus includes:
a second interface configured to receive the request from the image processing apparatus and sends a response to the request to the image processing apparatus,
a power control unit configured to shift a power state of the image forming apparatus from a first power state to a second power state in which power consumption is lower than power consumption in the first power state, wherein the second interface receives a first type request from the information processing apparatus when the image forming apparatus is in the second power state and sends a response to the first type request to the image processing apparatus while maintaining the first power state,
wherein, when a condition for shifting the power state of the image forming apparatus from the first power state to the second power state is satisfied, the second interface sends a predetermined information to the image processing apparatus and the power control unit shifts the power state of the image forming apparatus from the first power state to the second power state,
wherein the first interface stops sending a second type request different from the first type request to the image forming apparatus and does not stop sending the first type request to the image forming apparatus according to the predetermined information.

2. The image forming system according to claim 1, wherein the first interface send a plurality of the second type requests to the image forming apparatus periodically, and stops sending the second type request according to the predetermined information.

3. The image forming system according to claim 1, wherein the image forming apparatus includes a processor whose power supply is stopped in the second power state and power supply is not stopped in the first power state.

4. The image forming system according to claim 1, wherein the first type request is an Address Resolution Protocol (ARP) request, a Simple Network Management Protocol (SNMP) state acquisition request, or an Internet Control Message Protocol (ICMP) neighbor discovery request.

5. The image forming system according to claim 1, wherein the image processing apparatus further includes a third interface configured to receive a print data from an external apparatus, and a control unit configured to generate raster image data based on the print data.

6. The image forming system according to claim 1, wherein the raster image data is printable data.

7. The image forming system according to claim 1, wherein the first interface send one or more requests to the image forming apparatus before stopping the sending the second type request and receives one or more responses to the one or more requests, and then the first interface stops sending a second type request to the image forming apparatus according to the predetermined information.

8. The image forming system according to claim 1, wherein the image processing apparatus further includes a third interface configured to receive an inquiry from an external apparatus and sends response to the inquiry to the external apparatus using information received from the image forming apparatus in advance.

9. The image forming system according to claim 1, wherein the first interface restarts sending a plurality of requests to the image forming apparatus according to a reception of print data from an external apparatus.

10. An image processing apparatus which is able to communicate with the image forming apparatus which forms an image on a sheet based on the image data, the image processing apparatus comprising:
a first interface configured to receive a print data from an external device;
a controller configured to generate image data based on the print data; and
a second interface configured to send the image data to the image forming apparatus and send a plurality of requests to the image forming apparatus,
wherein the image forming apparatus receive the request from the image processing apparatus and sends a response to the request to the image processing apparatus, and a power state of the image forming apparatus is shifted from a first power state to a second power state in which power consumption is lower than power consumption in the first power state,
wherein the image forming apparatus receives a first type request from the information processing apparatus when the image forming apparatus is in the second power state and sends a response to the first type request to the image processing apparatus while maintaining the first power state,
wherein, when a condition for shifting the power state of the image forming apparatus from the first power state to the second power state is satisfied, the image forming apparatus sends a predetermined information to the image processing apparatus and the power state of the image forming apparatus is shifted from the first power state to the second power state,
wherein the second interface stops sending a second type request different from the first type request to the image forming apparatus and does not stop sending the first type request to the image forming apparatus according to the predetermined information.

11. The image processing apparatus according to claim 10, wherein the second interface send a plurality of the second type requests to the image forming apparatus periodically, and stops sending the second type request according to the predetermined information.

12. The image processing apparatus according to claim 10, wherein the image forming apparatus includes a processor whose power supply is stopped in the second power state and power supply is not stopped in the first power state.

13. The image processing apparatus according to claim 10, wherein the first type request is an Address Resolution Protocol (ARP) request, a Simple Network Management Protocol (SNMP) state acquisition request, or an Internet Control Message Protocol (ICMP) neighbor discovery request.

14. The image processing apparatus according to claim 10, wherein the image data is printable data.

15. The image processing apparatus according to claim 10, wherein the second interface send one or more requests to the image forming apparatus before stopping the sending the second type request and receives one or more responses to the one or more requests, and then the second interface stops sending a second type request to the image forming apparatus according to the predetermined information.

16. The image processing apparatus according to claim 10, wherein the first interface configured to receive an inquiry from an external apparatus and sends response to the inquiry to the external apparatus using information received from the image forming apparatus in advance.

17. The image processing apparatus according to claim 10, wherein the second interface restarts sending a plurality of requests to the image forming apparatus according to a reception of print data from an external apparatus.

* * * * *